United States Patent
Fallet

(10) Patent No.: US 7,464,609 B2
(45) Date of Patent: Dec. 16, 2008

(54) MEANS FOR MEASURING FLUID FLOW IN A PIPE

(75) Inventor: Truls Fallet, Oslo (NO)

(73) Assignee: Sinvent AS, Trondheim (NO)

( * ) Notice: Subject to any disclaimer, the term of this patent is extended or adjusted under 35 U.S.C. 154(b) by 0 days.

(21) Appl. No.: 11/578,867

(22) PCT Filed: May 3, 2005

(86) PCT No.: PCT/NO2005/000145
§ 371 (c)(1),
(2), (4) Date: Jul. 25, 2007

(87) PCT Pub. No.: WO2005/108932
PCT Pub. Date: Nov. 17, 2005

(65) Prior Publication Data
US 2007/0261486 A1 Nov. 15, 2007

(30) Foreign Application Priority Data
May 3, 2004 (NO) .................................. 20041783

(51) Int. Cl.
*G01F 1/20* (2006.01)
(52) U.S. Cl. .................................................... 73/861.19
(58) Field of Classification Search ............. 73/861.19, 73/861.22, 61.49, 202; 367/83
See application file for complete search history.

(56) References Cited

U.S. PATENT DOCUMENTS

| 3,238,960 | A |   | 3/1966  | Hatch                     |
|-----------|---|---|---------|---------------------------|
| 3,640,133 | A |   | 2/1972  | Adams                     |
| 4,323,991 | A | * | 4/1982  | Holmes et al. ...... 367/83 |
| 4,938,053 | A | * | 7/1990  | Jepson et al. ....... 73/196 |
| 4,949,755 | A | * | 8/1990  | Thurston et al. ..... 137/833 |
| 5,321,257 | A | * | 6/1994  | Danisch ......... 250/227.16 |
| 5,339,695 | A | * | 8/1994  | Kang et al. ....... 73/861.19 |
| 5,827,976 | A |   | 10/1998 | Stouffer et al.           |

FOREIGN PATENT DOCUMENTS

EP 0 295 623 12/1988
JP 60-187814 9/1985

\* cited by examiner

*Primary Examiner*—Jewel V Thompson

(57) ABSTRACT

A means for measuring fluid flow through or into a pipe comprises a fluidistor element (11) arranged in a wall of a pipe splicing piece (10) inserted between sections of the pipe. A pressure sensor (3, 12) senses oscillations in the fluidistor element, and delivers a signal to an analyser (8) for deriving fluid flow rate, density and composition.

11 Claims, 5 Drawing Sheets

MEANS FOR MEASURING FLUID FLOW IN A PIPE

INTRODUCTION

The present invention relates to a means for measuring fluid flow in a pipe. More particularly, the invention relates to measuring liquid/gas flow, both volume and mass by utilizing a fluidistor principle for measuring volume flow, and thereafter this is combined with a differential pressure measurement that provides information about the fluid mass, as well as a spectral analysis of the pressure signal. These signals are combined in a mathematical model for characterizing the physical characteristics of the fluid.

BACKGROUND OF THE INVENTION

Numerous earlier patents describe fluidistors, used with negative feedback, as volume flow meters. In U.S. Pat. No. 3,238,960, the fluid oscillator is described as a volume measuring element in combination with an orifice plate for measuring the flow in a pipe. In U.S. Pat. No. 5,127,173, a somewhat different embodiment is used, with a feedback fluidistor and a Venturi for creating a motive pressure that gives a proportional flow through the measuring element. Various methods for detecting pressure pulsations with frequency proportional to the pressure, are indicated in these patents and other patents in this technical field.

U.S. Pat. No. 5,083,452 discloses how the acoustic noise pattern in a pipe with a restriction, can be used to characterize the liquid in the pipe by means of statistical analysis methods (multivariate analysis).

However, fluidistor measuring devices have so far only been used in the form of external add-on units of a bulky type, and hence they have not been of interest for downhole applications in oil production fields. It is therefore of interest to improve this technology to achieve such an extension of the area of application, because with this technique it is possible to obtain good measurements, and it is not necessary to make great demands on the pressure sensor to be used.

SUMMARY OF INVENTION

It is an object for the present invention to provide a multiphase fluid flow measuring means that provides good measurement results in downhole measurements in hydrocarbon wells.

It is another object of the present invention to provide a measuring means that is able to obtain precise measurement values for the different phases of a multiphase fluid flow.

It is a further object to obtain measuring means suitable both for influx into and flow through a production pipe in a hydrocarbon well.

Further, it is an object to utilize a fluidistor meter in order to achieve good flow measurements downhole, without making great demands on the pressure sensor of the fluidistor.

These and other objects are achieved by providing a means for measuring fluid flow in pipes such as defined in the appended claim 1.

Further objects and advantages are achieved through the further specified means that appear from the attached dependent claims 2-11.

The above stated objects and advantages, as well as a more detailed explanation of the mode of operation of the invention, will appear more clearly from the following detail description of preferable embodiments of the invention, and the description should also be read in conjunction with the appended drawings.

SHORT DESCRIPTION OF THE DRAWINGS

DETAIL DESCRIPTION OF THE MEASURING MEANS

All previous patents have been centered on measuring the volume flow. The present invention discloses additionally a method for characterizing the fluid (liquid or gas) flowing through the fluidistor, thereby to be useful as a volume meter and fraction meter for a multiphase flow. Different variants of the fluidistor may advantageously be used for different liquid compositions. A combination of several different elements may be used at the same time in order to extend the usefulness of the measuring system, in that the amount of data leads to an over-determined system of equations.

When a flowing fluid is slowed down, the stagnation pressure will approximately follow the Bernoulli law, and will consequently be proportional to the fluid density and to the liquid velocity squared. When the volume flow is known, knowledge about the amplitude of the pressure pulsations may consequently be used to find the density of the fluid. In addition, the energy distribution of pressure pulsations way up in the frequency spectrum will characterize numerous other properties of the fluid.

Fluidistors are characterized by the fact that they contain no movable parts, and they are also well suited for non-ideal fluids that contain particles. The design of a fluidistor as a pipe wall like in this specification, provides a compact construction that is well suited for well applications.

All necessary quantities to be used when characterizing fluid flow and type, will be extracted from one simple differential pressure gauge. This gauge measures the pressure difference between two characteristic points in the fluidistor. The gauge needs to have a short response time, so that the complete spectrum of pressure pulsations will be reproduced correctly, from a few Hz up to many kHz.

The differential pressure gauge may be of piezoelectric or optical type. The signals are transmitted from the measuring position to an analyser that carries out the frequency spectrum analysis, thereafter to compare this to reference spectra through so-called multivariate statistical analysis. From this analysis, information regarding fluid flow and characteristic properties will be extracted.

Figure 1:
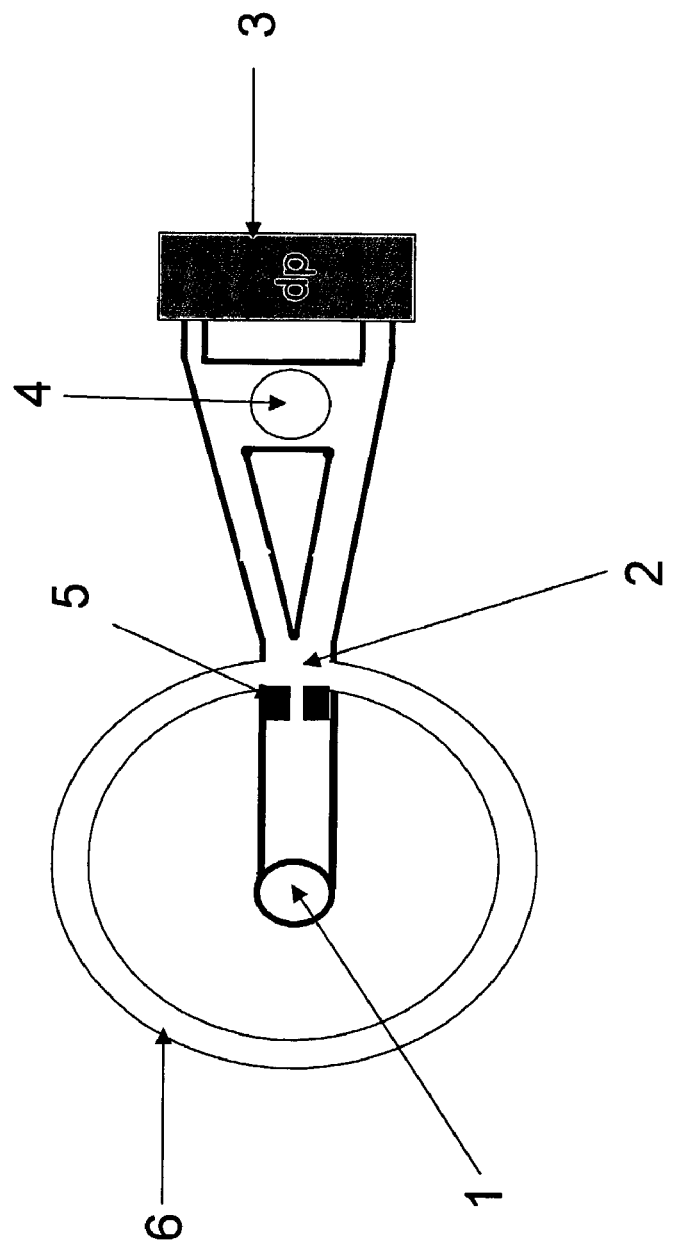
FIG. 1 shows a concept sketch of a feedback fluidistor with a differential pressure gauge for characterizing the flow.

The feedback fluidistor is illustrated in a plane embodiment in FIG. 1. The fluid flows into the gauge through a hole 1 from an area above or below the drawn plane. The fluid flows further through nozzle 5 and into control area 2. A pressure difference between the two sides of the jet in the control area will shift the jet toward one or the other of two outlet channels, and the jet will hit the differential pressure gauge with varying force.

The feedback channel 6 connects the pressure from one side of the control area to the other side, with a delay which, together with the amplification in the element, gives rise to an oscillation, by making the outlet flow alternate back and forth between the two outlet channels.

Finally, the fluid flows out of the fluidistor through hole 4, and the pressure difference between the two channels is recorded by differential pressure sensor 3.

The sketch shows only one of many different embodiments, and it can be referred to other variants disclosed e.g. in U.S. Pat. No. 5,127,173, U.S. Pat. No. 3,238,960, U.S. Pat. No. 3,640,133, U.S. Pat. No. 3,802,283, U.S. Pat. No. 4,323, 991 and U.S. Pat. No. Re 31,683. Different variants have somewhat different characteristics, and are suitable for different media.

Figure 2:
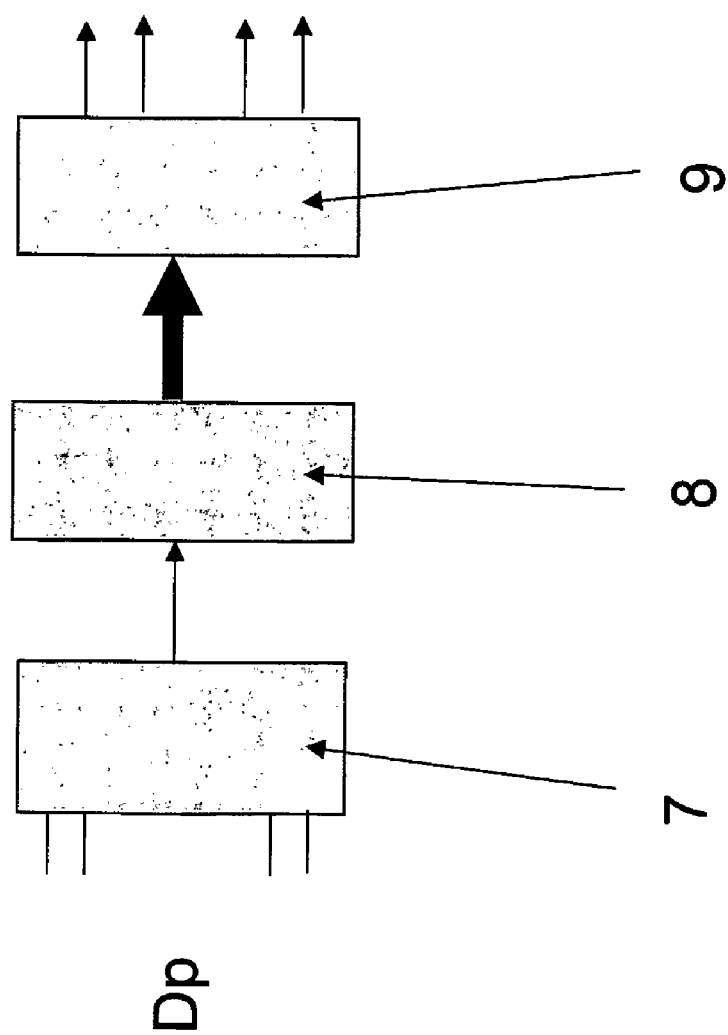
FIG. 2 shows a block diagram of the signal path from sensor element to output signals.
Figure 5:
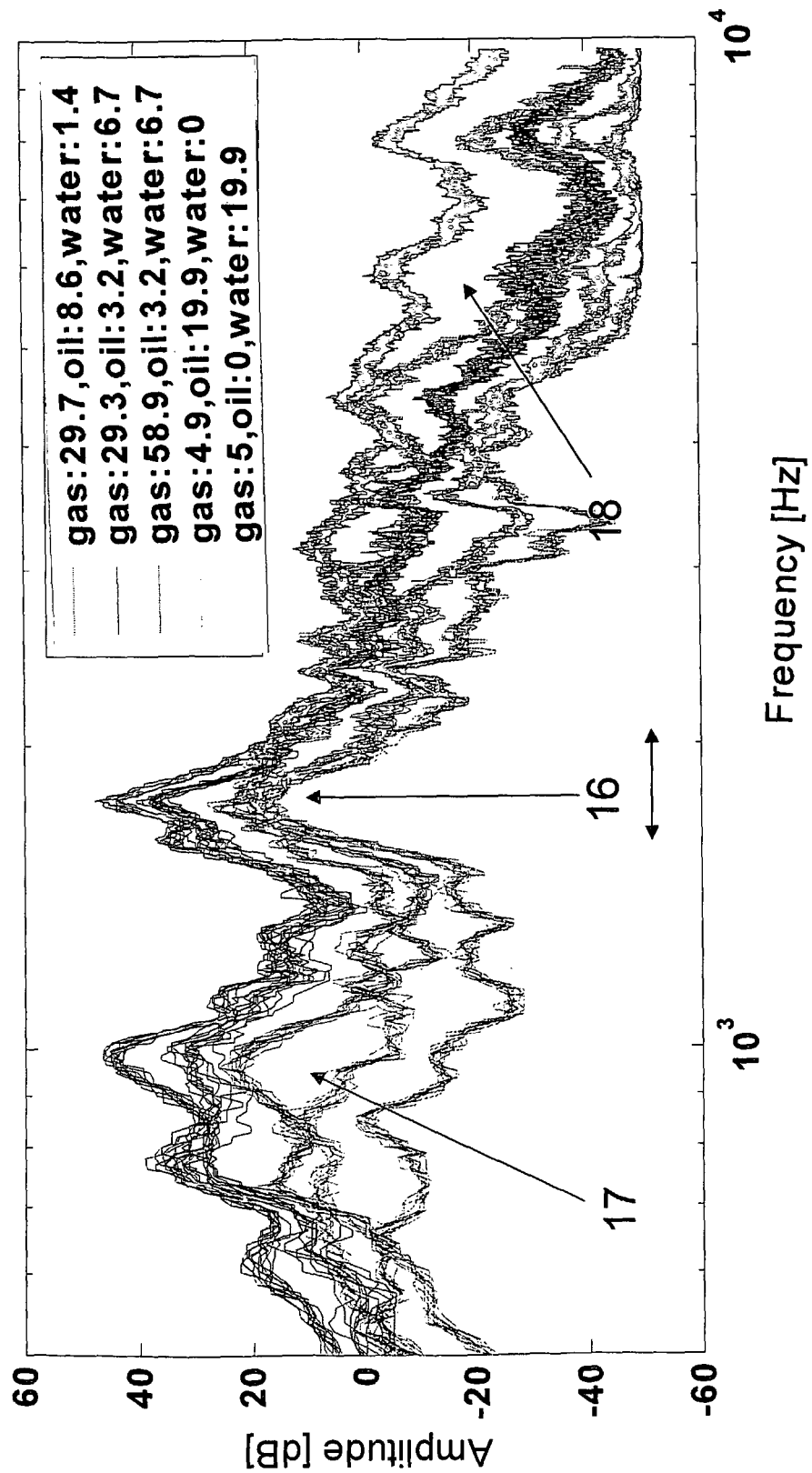
FIG. 5 shows an example of a frequency spectrum, and how this spectrum is changed as a function of the liquid/gas composition in the fluidistor.

The signal propagation in the system is illustrated in the block diagram in FIG. 2. The pressure difference between the two inputs is measured by means of sensor element 7, which sensor element has a wide frequency response so as to record both rapid and slower pressure differences. Typically, sensor element 7 may be a thin diaphragm with an optical fibre responding to tension/pressure in the diaphragm. An electric variant can be made on the basis of piezo crystals. In all cases, the signal is frequency analysed in analyser 8. The information from this analyser is the power density in various frequency bands. Based on this information, which is illustrated in FIG. 5, characteristic features of various fluids and compositions can be extracted. The frequency of the main resonance 16 shifts along with volume flow. Other parts 17 and 18 of the spectrum change in different manners along with different fluid compositions. The frequency spectrum is analysed by means of a multivariate analyser 9.

The sensor element 7 must be mounted in immediate connection with the fluidistor element. From this point, one single optical fibre may guide the complex signal out of the well to be analysed topside. If an electric signal transmitter is used, it will be natural to carry out the frequency analysis 8 in immediate adjacency of the sensor element, thereafter to forward information regarding the energy in the various bands up to surface equipment that undertakes the multivariate analysis.

Figure 3:
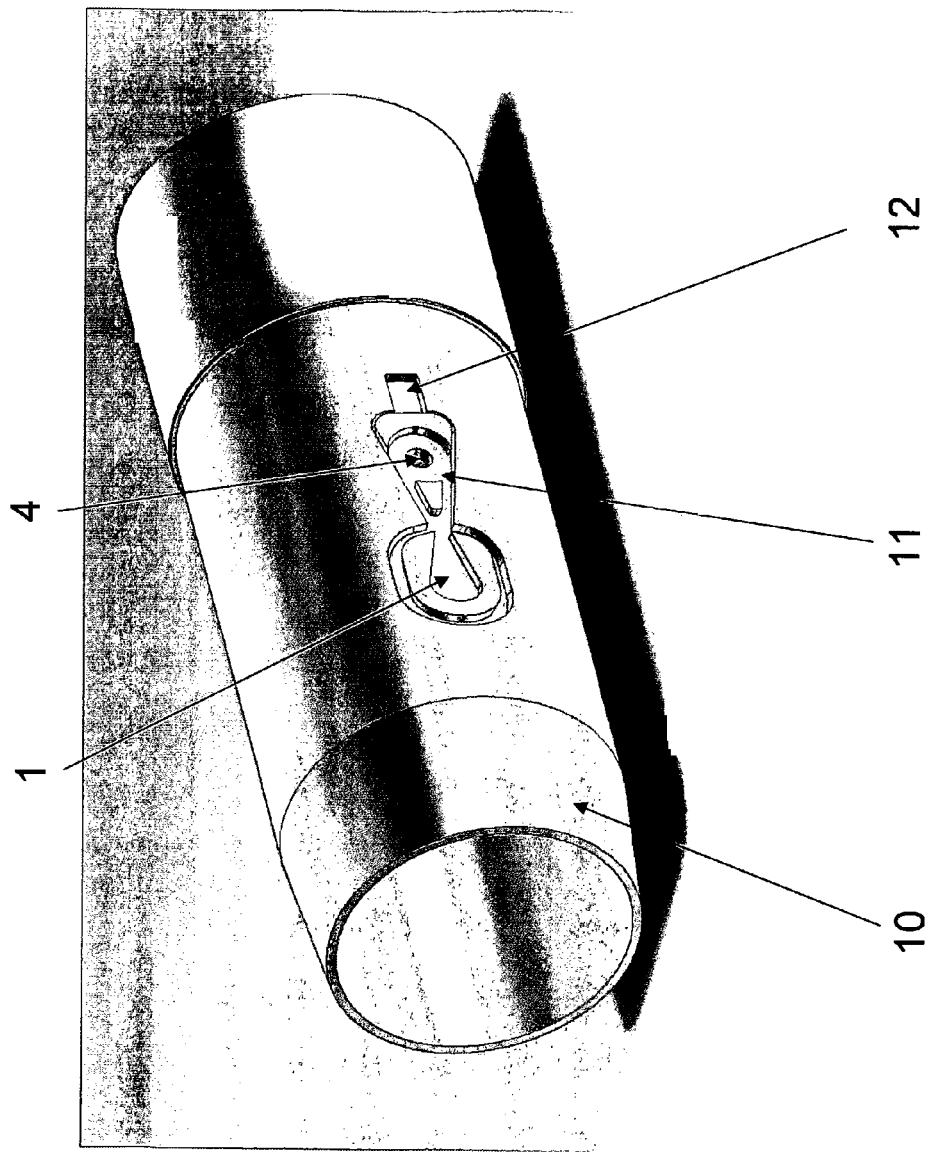
FIG. 3 shows an example of a production pipe in a hydrocarbon well, with a built-in fluidistor used for direct measurement of influx amount from the surroundings and into the pipe.

Preferably, the fluidistor is built into the wall of a pipe splicing piece 10 which is inserted into the production pipe illustrated in FIG. 3. In this example, fluidistor 11 is constructed by milling in the bulk of the wall, and is covered by a sleeve that is not shown in the drawing. The illustrated embodiment is intended for influx from the outside through a hole in the sleeve, indicated as reference 1, and has its outlet into the production pipe through hole 4. The differential pressure gauge is arranged in the recess having reference 12.

Figure 4:
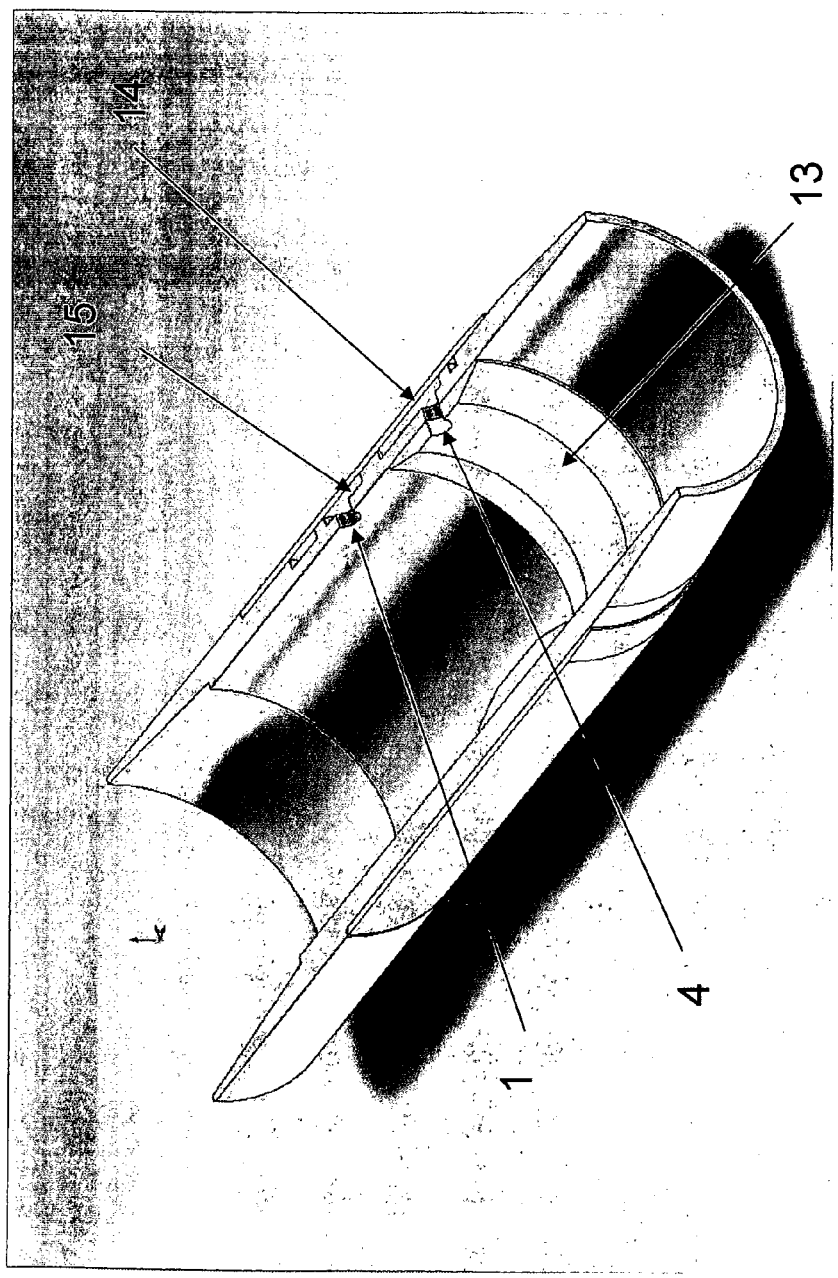
FIG. 4 shows an example of a construction where a dynamic pressure generated by the flow through the production pipe is used to impel a proportional flow through the fluidistor.

The measuring device can also be used for measuring liquid flow inside the production pipe. Then, an inlet hole 1 is arranged in the pipe wall as shown in FIG. 4, and the exhaust hole 4 is arranged in a narrowed area formed by the Venturi section 13. Alternatively, it is possible to use a pipe enlargement to create the necessary dynamic pressure difference. In such a case, the inside diameter in area 13 represents the normal inside diameter of the pipe, while the inlet area 1 has been machined to have a diameter larger than the nominal pipe diameter.

The invention claimed is:

1. The system measuring fluid flow through or into a pipe, in the form of a short pipe splicing piece inserted between sections of said pipe, wherein a wall of said pipe splicing piece contains a fluidistor element which responds to a current fluid flow, and a sensor for sensing oscillations in said fluidistor element, said sensor being connected to an analyser for deriving fluid flow rate, density and composition.

2. The system of claim 1, wherein said pressure sensor comprises an optical fibre arranged to respond to said pressure difference.

3. The system of claim 2, which comprises equipment adapted to transmit light into the optical fibre, and to detect the fibre response to said pressure difference by measuring light output from said fibre.

4. The system of claim 3, wherein said fibre contains a Bragg grating having a grating spacing that depends on the pressure difference.

5. The system of claim 3, wherein said equipment comprises an interferometer for detecting a pressure difference related change in light path length through said fibre.

6. The system of claim 1, which comprises an analyser connected to said pressure sensor, said analyser comprising a processor unit programmed with calculation algorithms, wherein one algorithm calculates fluid flow rate on the basis of measured oscillation frequency in said fluidistor element, another algorithm calculates fluid density on the basis of measured amplitude of said pressure oscillations, and a further algorithm calculates fluid composition on the basis of analysed energy distribution in a power spectrum for said pressure oscillations.

7. The system of claim 1, wherein said fluidistor element is constructed as a part of a wall of said pipe splicing piece.

8. The system of claim 1, wherein said sensor is a pressure sensor adapted for measuring oscillating pressure difference between positions in said fluidistor element.

9. The system of claim 1, for measuring fluid influx into a pipe, wherein said fluidistor element is provided with an inlet for fluid from the outside of said pipe splicing piece and with a joint outlet toward the inside of said pipe splicing piece, in such a manner that at least a representative part of said fluid flows into the pipe through said fluidistor element.

10. The system of claim 1, for measuring fluid flow through a pipe, wherein said fluidistor element is provided with an inlet from, as well as a joint outlet to the inside of said pipe splicing piece, inlet and outlet being at different levels along the flow direction, said pipe splicing piece exhibiting an inside diameter variation between said inlet and outlet, said diameter variation causing a fluid dynamic pressure difference which drives a fluid flow through the fluidistor element, at a flow rate that is approximately proportional to the flow rate of the fluid flow through the pipe.

11. The system of claim 1, wherein said pipe splicing piece with fluidistor element is located in a hydrocarbon well production pipe.

* * * * *